United States Patent [19]
Pavuk et al.

[11] 3,950,208
[45] Apr. 13, 1976

[54] METHOD OF MAKING EGG CARTONS

[75] Inventors: Frank Eugene Pavuk, Methuen, Mass.; Roger Henry Steiner, Londonderry, N.H.; Sumner Sheldon Feinstein, West Peabody; Richard Joseph Venuti, Billerica, both of Mass.

[73] Assignee: Borden, Inc., Columbus, Ohio

[22] Filed: Aug. 17, 1973

[21] Appl. No.: 389,309

[52] U.S. Cl. .......... 264/156; 229/2.5 EC; 229/44 R; 229/45 EC; 264/321
[51] Int. Cl.² B29C 17/04; B29C 17/10; B29D 27/00
[58] Field of Search ...... 264/321, 153, 156; 229/45, 229/44 R, 2.5, 2.5 EC

[56] References Cited
UNITED STATES PATENTS

| | | | |
|---|---|---|---|
| 3,326,443 | 6/1967 | Burkett | 264/321 X |
| 3,475,526 | 10/1969 | Seto | 264/153 |
| 3,519,189 | 7/1970 | Bambara et al. | 229/45 X |
| 3,572,578 | 3/1971 | Rohdin | 229/45 X |
| 3,640,668 | 2/1972 | Brown et al. | 264/321 X |
| 3,651,976 | 3/1972 | Chadbourne | 229/2.5 X |
| 3,670,952 | 6/1972 | Venuti et al. | 229/45 X |

*Primary Examiner*—Philip Anderson
*Attorney, Agent, or Firm*—George P. Maskas; George A. Kap; Daniel D. Mast

[57] ABSTRACT

A foamed plastic sheet is perforated medially before it is heated in an oven following which, it is conveyed between a pair of matching molds where a quad of egg cartons is formed in an upside down condition with locking lugs of a pair of cartons on one side of the perforated line facing the lugs of the other pair across the perforated line. Perforation of the sheet is made to relieve stress in the region where the lugs are formed.

3 Claims, 5 Drawing Figures

METHOD OF MAKING EGG CARTONS

This invention relates to a method of making articles, particularly egg cartons, from foamed plastics such as polystyrene, vinyl chloride and polyethylene.

In an egg carton, such as described in the Venuti et al U.S. Pat. No. 3,670,952, it is important that the latching lugs are formed to the full extent so that the lugs would properly mate with the lug recesses. If the lugs are formed so that they extend only partially from the front panel of the egg carton cover, they will extend only partially into the lug recesses upon closing of the egg carton with the result that the engagement of the cover to the tray will not be as secure as it otherwise should be.

U.S. Pat. No. 3,475,526 describes formation of deep-drawn articles by providing perforations on all sides of the material from which the article is to be formed. It is believed that this patent does not obviate the invention described herein.

In the past, foamed egg cartons were made by intermittently feeding a continuous sheet of foamed plastic into a heating oven whose heaters are maintained at 600° to 80° F., heating the sheet to a temperature of 200° to 240° F. to impart plasticity thereto and to allow the sheet to undergo secondary foaming whereby its thickness was increased from one and onehalf to three times the original thickness. This sheet was then moved under matching molds where the molds were allowed to compress the sheet to form the egg cartons. Four matching molds were normally provided to form a quad of egg cartons. This quad of cartons was then separated into individual egg cartons and stacked.

In the method described herein, the quad of cartons is arranged with the covers disposed inwardly and facing each other. This means that the latching lugs and the stacking depressions are formed generally in the central region of the foamed sheet. Mole elements which form the latching lugs and the stacking depressions are mounted on a shaft and are moved into position to form the lugs and the depressions after the mods are closed. Since the lugs and the depressions are formed from the foamed sheet material which is generally centrally disposed, there is a great deal of stress in this region which has caused poor formation of the latching lugs. After scrutinizing this aspect of the molding operation, it was discovered that because of high stresses in the foamed sheet, the movable mold elements which form the lugs and the stacking depressions were deflected and, therefore, lagged behind the remainder of the mold when the mold sections were closed with the result that the depth or extent of the lugs was reduced and latching of the cover to the tray was jeopardized.

To obviate the problem of the malformed lugs, it was proposed to perforate the foamed sheet centrally so that a pair of egg cartons was formed on one side of the perforation and the other pair, on the other side. With this innovation, it was found that quality of the lugs improved dramatically in that the lugs took on greater cross-sectional area and were much more rigid because the non-stressed sheet was locally available for lug formation.

A complete description of the invention will now be made in connection with the drawings wherein.

Figure 3:
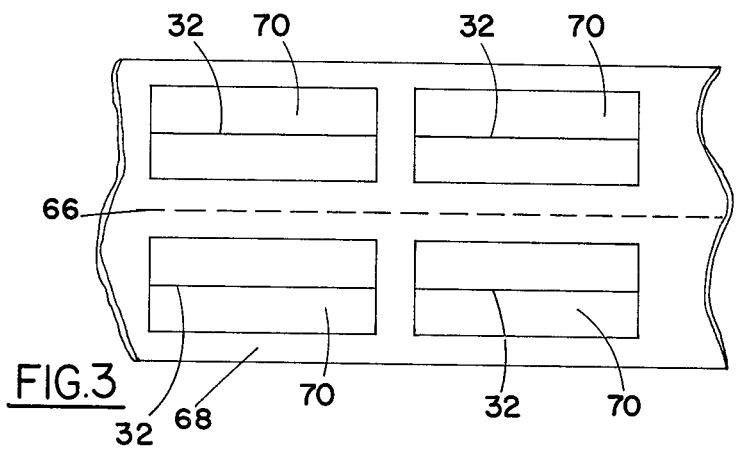
Figure 4A:
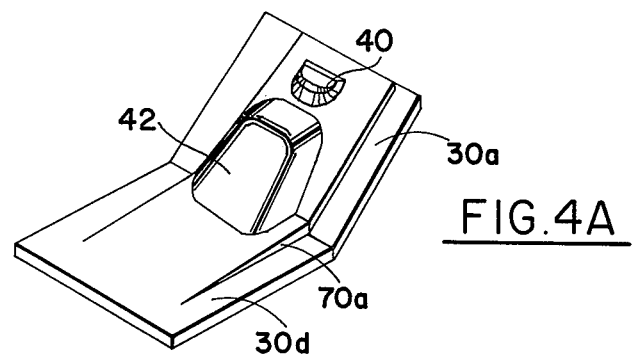
Figure 4B:
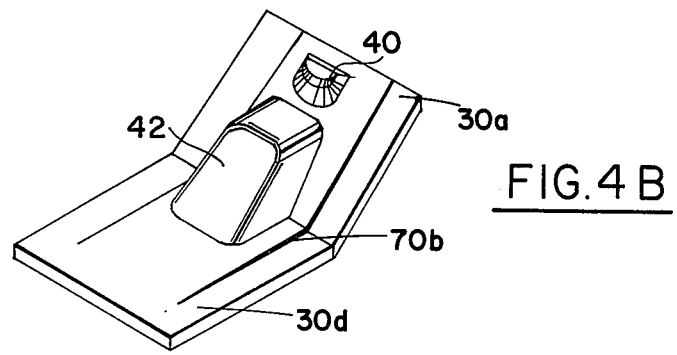

FIG. 3 is a perspective view of a centrally perforated foamed sheet with a schematic disposition of the four egg cartons; and FIG. 4 is a side by side comparison of lug and stacking depression sections formed from a perforated and non-perforated sheet showing very clearly the deep impression made by the movable mold element in the case of a carton made from a nonperforated sheet (FIG. 4A) and a relatively negligible impression when a perforated sheet was used (FIG. 4B).

Figures 1, 2:
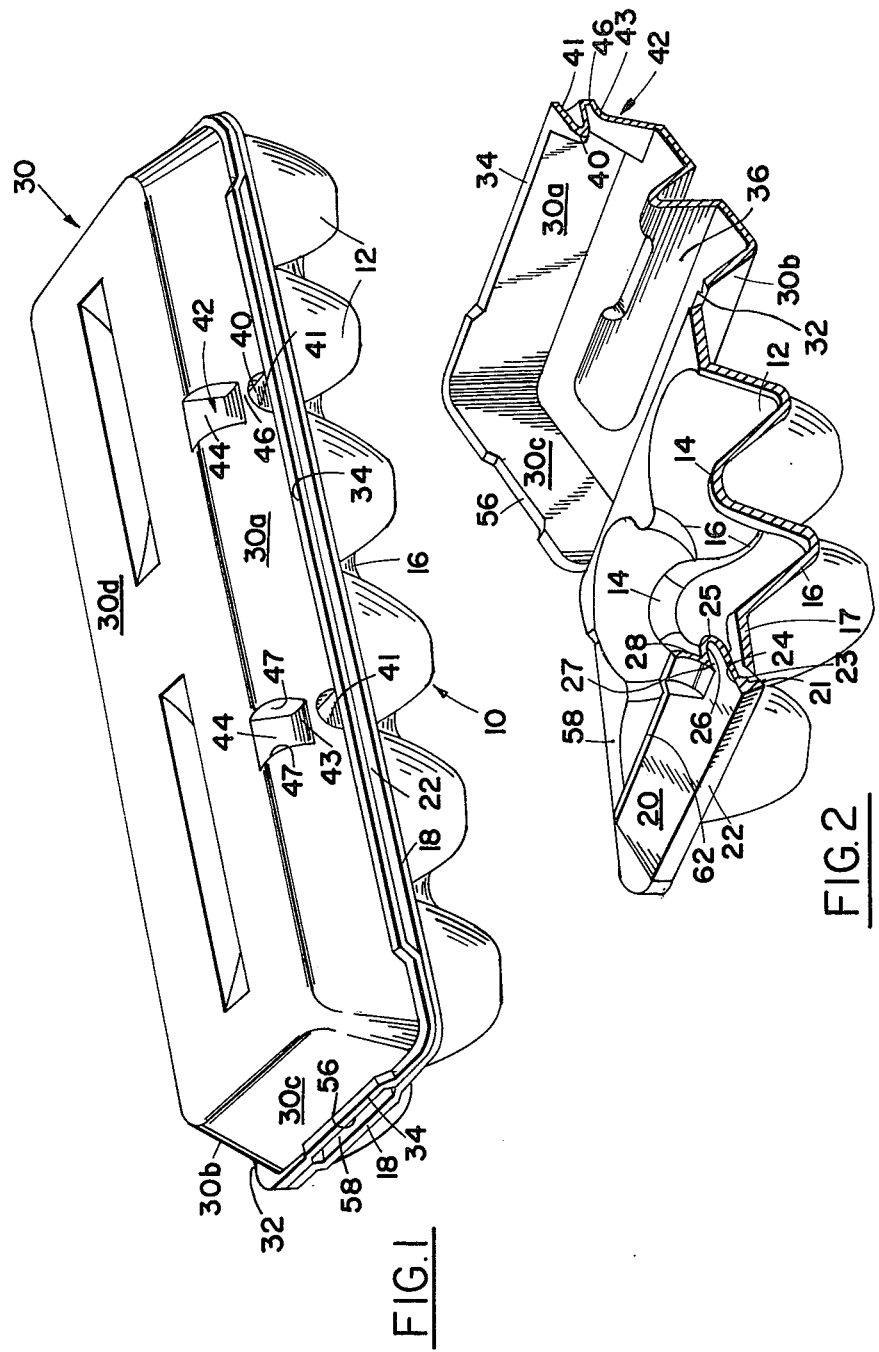
FIG. 1 is a perspective view of the egg carton shown in a closed condition.
FIG. 2 is a partial perspective view of the egg carton in an open condition.

Referring now to the drawings wherein identical numerals refer to identical parts, FIGS. 1 and 2 illustrate a carton which has a lower tray 10 formed with a number of individual generally concave cells 12, there being one cell for each egg. The bottom of each cell is shown as being flat with a raised circle. In the most common configuration, which is shown in the drawings, there are two rows of six cells to hold a dozen eggs. Of course, other cell arays, such as three by four, can be used. A quad of adjacent cells is joined by a generally convex projection or post 14 which is the terminal point of cell divider walls 16. The projections 14 are hollow on the bottom side of the tray so that another projection 14 can fit within the hollow portion when the cartons are in open stacked condition. Walls 16 extend both parallel and transversely to the longitudinal axis of the tray 10. The projections 14 extend above the cell walls and also above peripheral rim 18 which is formed around the two ends of the tray outwardly of platform 17. Extending upwardly from the front edge of the tray is a hinge 21 which secures the tray to a latching flap 20. The latching flap 20 is bent upwardly from the tray in the closed condition so that it has a natural tendency to swing outwardly with respect to the central cell area of tray 10 when upward biasing force is applied.

The hinge 21 is connected directly to a riser 22 which permits the bottom wall 24 of the lug receiving recess 25 in the flap 20 to be swung above the hinge area and on to the top or outer edges of platform 17. A thickened portion 23 on the rear side of the riser 22 forms an abutment against platform 17 to prevent the flap from extending unduly inwardly. Above riser 22 and abutment 23 there is a molded inward lug receiving recess 25 formed in the shape of a thimble having a shortened upper wall. Thus, the lower wall 24 of the recess extends further outwardly than the top wall 26 thereof. The top wall 26 of the recess terminates in a ridge 27 which is the outer top wall of the recess 25. An inward vertical channel 28 is molded above the outer edge of ridge 27. The channel 28 extends to the top end of the latching or locking flap 20 and has a width which is at least as great as the width of recess 25 in order to permit the latching lugs to be guided thereby into the locking position. The channel 28 permits the lugs 40 to move downwardly within the channel and thus acts as a guideway directing lug 40 over rim 27 and into recess 25.

A cover 30 is hinged at 32 to the rear top portion of the tray 10. The hinge can be of any suitable, conventional construction. the cover 30 has respective front, rear, side and top panels 30a, 30b, 30c and 30d which surround and taper slightly outwardly from top panel 30d so that the covers of the carton can be stacked. A peripheral lip 34 is formed around the front panel 30a and the two side panels 30c. Spaced reinforcing ribs 36 are formed in the top wall 30d and extend partially along a straight line between side panels 30c. The ribs 36 extend downwardly from the top panel 30d and are shown as being generally V-shape with two outwardly angled side walls and adjoining bottom wall. As seen in FIG. 2, the rib 36 is a depressed area of the cover top panel 30d which is formed during the molding operation. The construction provides substantial rigidity and safety factor against downward pressure in the closed carton condition since the rib abuts against the posts 14.

A plurality of hollow inwardly projecting latching lugs 40 are formed inwardly of the front peripheral lip 34. It is preferred that at least two such lugs 40 be provided to assure adequate latching.

A plurality of lug-stacking vertical channels or depressions 42 are also formed on the front panel 30a of each carton above each lug 40, as viewed in FIG. 1. the size and shape of each lug-stacking depression 42 is such that a lug 40 of another carton can nest therein, which permits stacking. The depressions are shown as being generally in the shape of a step having their side walls 47 extending inwardly toward the interior of the cover, with tread 43 and riser 44.

The latching lugs 40 and the stacking depressions 42 are in substantially the samae vertical plane. The bottom wall 41 of the lug, in the locked or closed condition, mates over the top of the bottom wall 24 of the lug receiving recess. The bottom wall 41 merges into margin 24 and forms an area for finger engagement to lift the cover outwardly and upwardly in order to open the carton. Each lug 40 has a top outer rim 46 which is in substantially the same plane or slightly inwardly thereof of the planar portions of the front cover 30a. The top of rim 46 extends upwardly and inwardly to form the lug stacking depression 42 as described herein above. The inside of front cover 30a has a space between lug 40 and tread 43 for receiving the ridge 27 above lug receiving recess 25.

The latching flap 20 extends above the tray rim 18 to a height slightly less than that of the cover front panel 30a. As can be seen particularly in FIG. 2 cut out portions 56 in the cover and 58 in the tray define slots therebetween ensuring ventilation of the carton.

To lock the carton after it has been filled with eggs, the latching flap 20 is swung up to the position shown in FIG. 2 if it is not already in that position. The cover 30 is pressed downwardly and lugs 40 are guided within and downwardly of channels 28 until the latching lugs 40 pass over ridges 27 and into the lug receiving recesses 25 of the latching flap. Abutment 23 and even the underside of wall 24 are pressed against platform 17 as lug 40 passes over rim 27. Flap 20 has a tendency to move outwardly so that recess 25 maintains mating contact with lug 40. To open the cover, both an upward and an outward force is applied to cover front panel 30a.

The egg cartons are formed by intermittently feeding a sheet of foamed plastic about ⅛ inch in thickness into an oven whose heaters are maintained at 600° to 800° F. where the sheet is heated to a temperataure of 200° to 240° F. The residence time of the sheet in the oven is 6 to 8 seconds which is the equivalent of three indexings of the sheet. The sheet is heated to render it more pliable and expandable to a thickness of about twice its original thickness. The heated sheet is then moved between a pair of matching molds which are closed to form ma quad of cartons. Movable mold elements are activated upon mold closure to form lugs 40 and depressions 42.

In FIG. 3, perforated centerline 66 is provided in foamed sheet 68 which passes medially between two pairs of egg carton molds. The perforation are about ½ inch long with spacing therebetween also of about ½ inch. These numbers are given by way of illustration and not by way of limitation since any suitable perforation will serve adequately. Disposed on opposite sides of the perforated centerline are, schematically illustrated egg cartons 70, 70. The cartons are arranged so that the covers of the cartons on one side of the perforated centerline face the covers of the cartons on the opposite side. Furthermore, the cartons are disposed upside-down when they emerge from the molding section with the cells of the tray and interior of the cover facing down.

The perforations or slits in the foamed sheet can be made in any suitable fashion, as by means of a rotary wheel having equally spaced cutting elements. The rotary wheel can be driven by the forward intermittent motion of the sheet as it enters the heating oven. After passing through the oven and before entering between the matched molds, the perforations appear to be extended and more developed as a result of being heated.

Although in the preferred embodiment the foamed sheet is perforated before it is passed into the oven, it is possible to affect the same desirable results by perforating the foamed sheet after it issues from the oven. Further, same results can be obtained by completely slitting the foamed sheet along its centerline so that in effect a pair of egg cartons is made simultaneously from each half of the sheet.

FIG. 4A shows a section of the egg carton where the latching lug 40 and the stacking depression 42 are illustrated. Of particular significance here is the raised portion 70a which corresponds to the impression made by the movable mold element in the foamed sheet which was not centrally perforated. Because of the stress in the sheet, the impression of the raised portion is very pronounced and generally is offset from the front panel 30a about 1/16 inch. Since outward extent of lug 40 from raised portion 70a is about ⅛ inch, the relative dimensions are very significant. It is important to note that the offset of raised section 70a becomes progressively larger or thicker from top of front panel 30a to the intersection of front panel 30a with top panel 30d. This discrepancy results because the pivot point of the movable mold element is nearer the stacking depression 42 and with a stressed foamed sheet, the mold element does not close completely and thus forms the raised portion at an inclination to the front panel 30a. This is also the reason why the lug is shorter than when made from a stress-relieved sheet which allows fro complete closing of the mold element.

In FIG. 4B, the raised portion 70b is almost flush with the front panel 30a and is almost indistinguishable therefrom. Length of lug 40 is greater than an ⅛ inch by at least 1/32 inch and may be as much as ⅛ inch. In this instance, the improved results are attributable to the fact that the foamed sheet was centrally perforated between two pairs of egg cartons which provided the desired stress-relief in the area where inward or outward projections were formed, as for instance, lugs 40 and stacking depressions 42. By virtue of the fact that the foamed sheet was stress-relieved, mold elements close completely to the same angle of inclination as the front panel 30a.

As was already noted, because the foamed sheet is stressed, the movable mold elements which form lugs and depressions do not close completely and thus impress a pronounced raised portion 70 in the front panel 30*a* of the cover which is offset considerably at an angle from the plane of the panel in relation to the length of the lug itself. To visualize the problem more intimately, one has to imagine that in a closed condition, the egg carton will have the raised portion 70 flush against latching flap 20 in the region lug receiving recess 25 with lug 40 in residence within recess 25. Since lug 40 is shorter in the case of an egg carton made from a non-perforated sheet than when the carton is made from a perforated sheet. it will not penetrate fully into the recess 25 and the resulting engagement will not be secure. Of further detriment is the inclined raised portion 70 which rests against latching flap 20. Since lip 62 of flap 20 will abut the raised portion 70 at about the intersection of front panel 30*a* and top panel 30*d* where the thickness of the raised portion 70 is the greatest, the outer surface of flap 20 will not be disposed in a parallel relationship with the inner surface of front panel 30*a* but will be deflected away from front panel 30*a* drawing further away the lug from the lug receiving recess.

From the above discussion, it should be apparent that a shorter lug is formed in an egg carton when the foamed sheet is not perforated and misalignment of the latching flap with the front panel combine to create a locking engagement which does not have the deisred integrity. With the simple expedient of providing a perforated centerline in a foamed sheet, egg cartons are formed which are devoid of such locking problems.

It should be understood that although a method of forming egg cartons has been described, the aspect of perforating a sheet of expandable material to achieve stress-relief to obtain a product which has properly formed projections or depressions, applies as well to other articles.

We claim:

1. Method for forming at least one pair of egg cartons from a foamed thermoplastic sheet comprising perforating the sheet medially to form a centerline, heating the sheet to render it sufficiently pliable for forming the egg cartons, feeding the sheet between matching molds, closing the molds to form the pair of egg cartons and moving mold elements into place following mold closure to form projections in the egg cartons, the projections being formed adjacent to said centerline of medial perforations.

2. Method of claim 1 wherein a quad of egg cartons is formed with projections sof two egg cartons on one side of the sheet facing projections of the other two egg cartons disposed across the sheet.

3. Method of claim 2 wherein the projections include a lug and a stcking depression on the front panel of the cover.

* * * * *

UNITED STATES PATENT OFFICE
CERTIFICATE OF CORRECTION

Patent No. 3,950,208          Dated April 13, 1976

Inventor(s) Frank Eugene Pavuk, et al

It is certified that error appears in the above-identified patent and that said Letters Patent are hereby corrected as shown below:

Col. 1, line 25, change "80°F." to --800°F--;

Col. 1, line 39, change "Mole" to --Mold--;

Col. 1, line 42, change "mods" to --molds--;

Col. 3, line 68, change "ma" to --a--;

Col. 4, line 5, change "perforation" to --perforations--;

Col. 4, line 55, change "fro" to --for--;

Col. 5, line 10, insert the word "of" following --region--;

Col. 6, line 1, correct the spelling of the term "desired";

Col. 6, line 24, change "sof" to --of--;

Col. 6, line 27, change "stcking" to --stacking--.

Signed and Sealed this twenty-ninth Day of June 1976

[SEAL]

Attest:

RUTH C. MASON
*Attesting Officer*

C. MARSHALL DANN
*Commissioner of Patents and Trademarks*